3,503,909
LACQUER COMPOSITIONS CONTAINING NITROCELLULOSE, AN ETHYLENE/VINYL ACETATE COPOLYMER AND AN ESTER COMPONENT

Warren Bowman, Wilmington, Del., Dennis M. Roberts, Cincinnati, Ohio, and Paul G. Sellger, Pittsburgh, Pa., assignors to E. I. du Pont de Nemours and Company, Wilmington, Del., a corporation of Delaware
No Drawing. Filed Nov. 1, 1966, Ser. No. 591,108
The portion of the term of the patent subsequent to Nov. 4, 1986, has been disclaimed
Int. Cl. C09d 3/16
U.S. Cl. 260—17  3 Claims

ABSTRACT OF THE DISCLOSURE

This invention relates to nitrocellulose lacquers. More particularly, the invention relates to lacquers prepared from nitrocellulose, selected ethylene/vinyl acetate copolymers and sucrose acetate isobutyrate which provide coatings having high impact strengths.

BACKGROUND OF THE INVENTION

Nitrocellulose lacquers have been prepared which contain a great number of different ingredients. Generally the materials which have been used behave in a predictable manner. Accordingly, the ingredients can be combined to give a particular set of desired properties. We have found, however, that the novel combination of nitrocellulose, certain ethylene/vinyl acetate copolymers and sucrose acetate isobutyrate provides lacquers which have many desirable properties. However, the ingredients do not behave in a predictable manner.

For some applications it is essential that lacquer coatings have good impact strength while retaining a high degree of hardness. It is, therefore, an object of this invention to provide lacquers which yield tough, hard coatings.

DESCRIPTION OF THE INVENTION

The products of this invention are organic solvent containing lacquer compositions having a solids content comprised of the following essential ingredients: (A) from about 40 to 60% by weight of nitrocellulose, (B) from about 10 to 30% by weight of an ethylene/vinyl acetate copolymer having a copolymerized vinyl acetate content of about 35 to 42% by weight and a melt index from about 170 to 260, and (C) from about 20 to 40% by weight of sucose acetate isobutyrate. In preferred embodiments, the nitrocellulose is present in amounts from 45 to 55% by weight, the copolymer from 15 to 25% by weight and the sucrose acetate isobutyrate from 25 to 35% by weight.

The lacquer compositions provide coatings which are tough yet show no significant change in coating hardness. In fact, the hardness exceeds that obtained with some commerically available lacquers.

In preparing the lacquer compositions, the nitrocellulose may be selected from a variety of commercially available grades. The lower viscosity explosive grade nitrocelluloses are preferred. Selection of the ethylene/vinyl acetate copolymer is made from those copolymers having a copolymerized vinyl acetate content and melt index previously specified which may be prepared by the processes described in U.S. Patents 2,200,429 and 2,703,794. The vinyl acetate content of these copolymers can be determined by infrared analysis or by saponification number determination. The melt index of these copolymers is determined by tentative ASTM Test Method D–1238–62T using a temperature of 190° C. and a load of 2160 grams and is reported as the flow rate in grams per ten minute interval.

Conventional methods may be used to prepare the lacquers of this invention. In commercial processes, all of the ingredients may be added to a high-speed mixer and blended to provide a homogeneous solution.

In a batch-type operation, it may be desirable to dissolve the ethylene/vinyl acetate copolymer in toluene or xylene or a similar hydrocarbon solvent and then add the sucrose acetate isobutyrate to the solution. In order to facilitate mixing the nitrocellulose with the other components, it may be advantageous to prewet the nitrocellulose with a small percentage of toluene and then add the solvent for the nitrocellulose, e.g., a lower alkyl alcohol, such as isopropyl alcohol, and an additional solvent, such as n-butyl acetate. The nitrocellulose solution and the ethylene/vinyl acetate-sucrose acetate isobutyrate solution can then be stirred together and mixed to form a homogeneous solution. It will, of course, be appreciated that the ethylene/vinyl acetate and nitrocellulose are not generally soluble in the same solvents. However, various conventional solvents in addition to those mentioned may be selected for dissolving these materials.

The following example, in which parts and percentages are by weight unless otherwise specified, further illustrates the compositions of this invention.

EXAMPLE

A clear lacquer was prepared by mixing the ingredients set forth in Table 1 in the following proportions:

Table 1

| Ingredients: | Amount, percent |
|---|---|
| Nitrocellulose [1] | 50 |
| Ethylene/vinyl acetate copolymer [2] | 20 |
| Sucrose acetate isobutyrate | 30 |
| Total solids | 100 |
| Toluene | 50 |
| Isopropyl alcohol | 15 |
| n-butyl acetate | 35 |
| Total solvents | 100 |

[1] One-quarter second explosive grade nitrocellulose. Viscosity measured by ASTM Method D–301–56.
[2] Vinyl acetate content of 41.8 and melt index of 220.

The lacquers were made by first placing a mixture of the isopropyl alcohol and n-buyl acetate in a ball mill. Prior to adding the introcellulose to the ball mill, it was prewetted with a small portion (about 5%) of the final toluene requirement in order to prevent agglomeration prior to starting the mill. The ethylene/vinyl acetate copolymer was then dissolved in the remaining toluene and the sucrose acetate isobutyrate was then dissolved in this solution. The nitrocellulose solution was withdrawn from the ball mill, and the ethylene/vinyl acetate-sucrose acetate isobutyrate solution was stirred into it. The combined liquid mixture was returned to the ball mill and milled until a homogeneous solution was obtained.

The solvent content of separate portions of the solution was adjusted to provide lacquer compositions having 20%, 21.8% and 24% by weight of solids. These compositions had a viscosity at room temperature, as measured with a No. 4 Ford Cup, of 36 seconds, 49 seconds and 71 seconds, respectively, which indicated that all could be applied by conventional coating methods. A quart of the 20% solids lacquer was placed in a pressure-type commercial spray gun, and the lacquer was sprayed onto aluminum and sanded maple plywood panels to provide dry coatings approximately 1 mil in thickness. The aluminum panels were 4″ x 12″ x 0.15″ chromate-treated panels, and the maple panels were 6″ x 8″ x 0.25″.

The coated aluminum panels were tested with the following results being obtained:

Reverse impact strength [3]—>72 in./lb.
Hardness [4]—9.41 KHN.
Cross-cut adhesion [5]—100%.

[3] Determined using a Gardner Impact Tester with a four pound weight (panel actually tore).
[4] Measured using a Tukon Tester (Tukon number converted to Knoop hardness number).
[5] Described by Gardner and Sward in "Paint Test Manual" 12 ed., March 1962 (Procedure modified to use 25 squares per inch).

The wood panels were sanded with silicon carbide sandpaper following Federal Test Method Std. No. 141a, Sept. 1, 1965, (modified by using a 1300 gram, 2.5 inch by 2.5 inch block). There was no clogging of the sandpaper, and the scuffed-off portion of the coating was in powdered form.

It will be noted from the foregoing data that the coatings provided are particularly tough. In addition, the surface is hard. In this respect, in a comparative experiment, a commercially available nitrocellulose lacquer containing an alkyd resin was found to have a Knoop hardness number of only 6.36.

It will, of course, be apparent to those skilled in the art that in addition to the clear lacquers which have been described herein fillers, pigments and dyes, as well as other of the additives may be included in the novel compositions. These lacquers, both with or without additives, are useful in the coating of a variety of substrates in addition to the aluminum and wood panels described in the foregoing example.

We claim:

1. An organic solvent containing lacquer composition having a solids content comprised of the following essential ingredients: (A) from about 40% to 60% by weight of nitrocellulose, (B) from about 10% to 30% by weight of an ethylene/vinyl acetate copolymer having a copolymerized vinyl acetate content of about 35% to 42% by weight and a melt index from about 170 to 260, and (C) from about 20% to 40% by weight of sucrose acetate isobutyrate.

2. The composition of claim 1 in which the ethylene/vinyl acetate copolymer is present in an amount from about 15% to 25% by weight, and the sucrose acetate isobutyrate is present in an amount from about 25% to 35% by weight.

3. The composition of claim 2 wherein the solids content is comprised of 50% nitrocellulose, 20% of said copolymer and 30% sucrose acetate isobutyrate, and said solvent component is comprised of 50% by weight of toluene, 15% by weight of isopropyl alcohol and 35% by weight of n-butyl acetate.

References Cited

UNITED STATES PATENTS

| | | | |
|---|---|---|---|
| 3,051,670 | 8/1962 | Grantham | 260—17 |
| 3,232,895 | 2/1966 | Klein et al. | 260—27 |
| 3,321,420 | 5/1967 | Unger | 260—17 |
| 3,338,778 | 8/1967 | Hutchins et al. | 161—226 |

WILLIAM H. SHORT, Primary Examiner

L. M. PHYNES, Assistant Examiner

U.S. Cl. X.R.

117—104; 260—17.4, 31.2